Patented Feb. 9, 1932

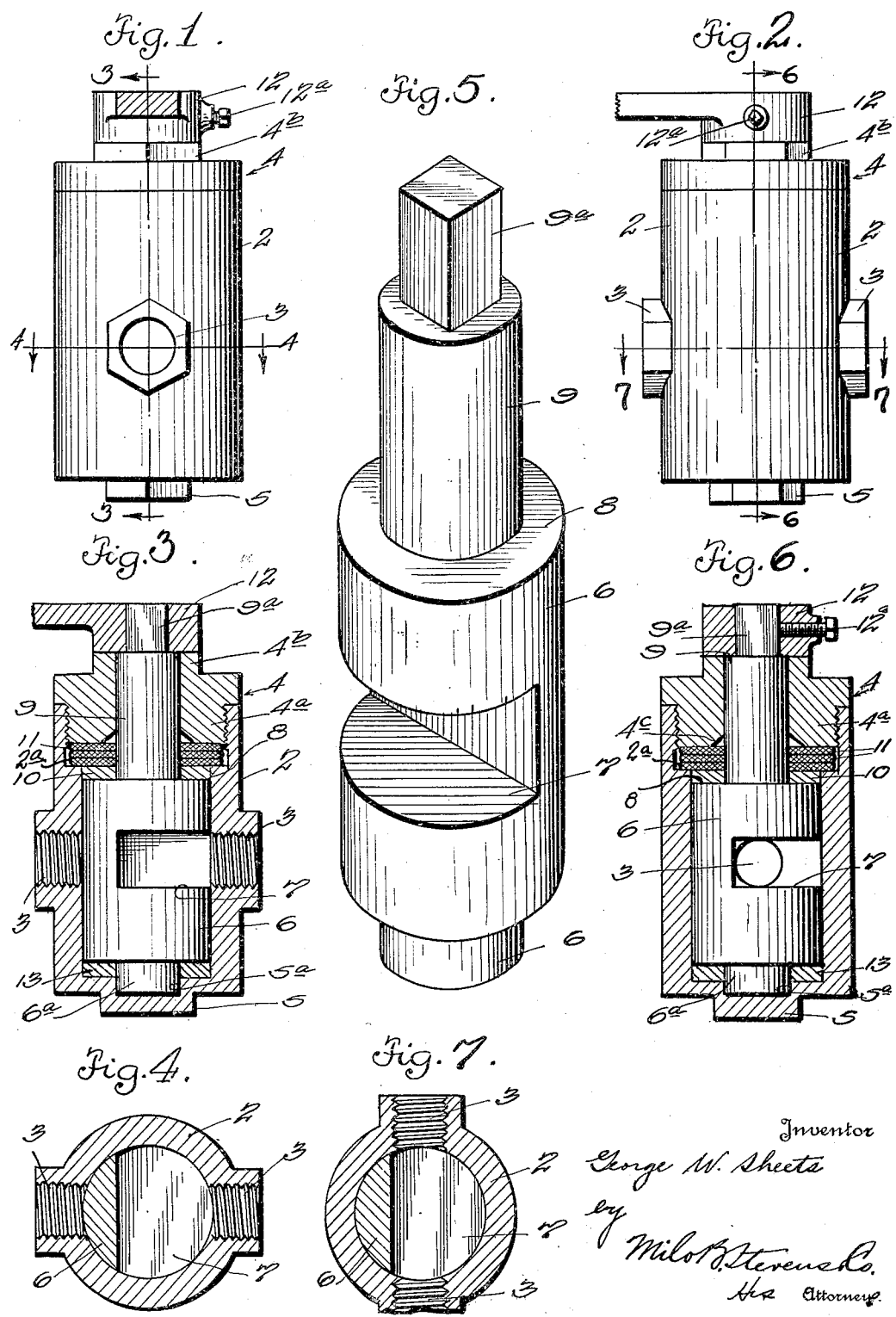

1,844,046

UNITED STATES PATENT OFFICE

GEORGE W. SHEETS, OF SPARROWS POINT, MARYLAND

VALVE

Application filed March 5, 1931. Serial No. 520,428.

My invention relates to improvements in valves and particularly to heavy duty valves such as are used in high pressure steam or other fluid lines.

Briefly stated,—the invention has for its primary object to provide a valve for the purpose specified and wherein the packing is protected from the action of the fluid; one wherein the fluid is discharged perpendicularly to the axis and exposed surface of the valve so as to obviate any tendency of the fluid to move the valve in an axial direction,—and generally to furnish a valve which comprehends a minimum number of exceedingly durable parts so assembled as to assure a minimum of wear so that the life of the valve will be long and its service thoroughly efficient.

Another object of the invention is to provide in a heavy duty valve for the purpose specified, a fluid control element or valve proper which may be manipulated to allow a straight shot of fluid through the valve casing, and which will not diminish the fluid pressure or flow volume,—the nature of the construction being such that pockets within the valve casing are effectually eliminated.

A still further object of the invention resides in the provision of a packing support, in part provided by the casing and in part by the valve body, and associated with said packing a closure means for actuating the same axially of said valve so that it will assume a sealing relationship with respect to the body and casing.

The invention also resides in certain novel features of construction, combination and arrangement of the various parts and in certain modes of operation, all of which will be readily understood by those skilled in the art upon reference to the accompanying drawings in connection with the detailed description appearing hereinafter.

It is understood that I have disclosed herein what now appears to be a preferred embodiment of the invention. However, it is manifest that the disclosure herein is susceptible of various changes and modifications within the spirit and scope of the subject matter claimed hereinafter.

In the drawings, wherein the same reference characters have been used to designate the same parts in all views, Figure 1 is an elevational view partly in section illustrating a valve embodying my invention;

Figure 2 is another elevational view of the valve;

Figure 3 is a vertical sectional view taken on the line 3—3 of Figure 1 and looking in the direction of the arrows;

Figure 4 is a cross sectional view showing the valve body in its closed position,—said view being taken on the line 4—4 of Figure 1;

Figure 5 is a perspective view of the valve body removed from the casing;

Figure 6 is a vertical sectional view taken on the line 6—6 of Figure 2 and showing the valve in its opened position, and Figure 7 is a cross sectional view taken on the line 7—7 of Figure 2.

Referring to the drawings by reference characters, numeral 2 denotes the valve casing which will be of heavy metal and may, of course, be made in different sizes and with different wall thickness according to the anticipated maximum pressure in the line in which the valve is intended to be used.

The casing 2 is provided with diametrically opposite tapped bosses providing fluid passage-ways, as shown at 3.

One end of the body is enlarged and threaded to receive the exteriorly threaded boss portion 4a of the flanged cap 4, whose upper surface is provided with the hexagonal boss 4b for the application of a wrench in screwing the cap into position.

The lower end of the casing is closed and provided with a reduced extension 5 so as to furnish sufficient body stock for the countersink, or bearing recess 5a, which is adapted to receive the pintle or stub shaft extension 6a of the valve body 6.

In carrying out the invention, the valve body 6 is provided with a transverse notch 7 which is of a height,—that is to say in the direction of the axis of said valve body, equal to the diameter of the fluid passages 3 of the casing. The depth of the notch or cutout 7 is such that when the valve is opened, as shown in Figures 5 and 7, the rear wall of the notch 7 will be substantially alined with the adjacent wall of the passage-ways 3 or tangential thereto.

The cutout or notch 7 therefore provides a straight shot or passage for the fluid between the two casing passageways 3. There are no pockets which will in any way obstruct the passage of the fluid. When the valve is in the closed position, as depicted in Figures 3 and 4, the pressure of the incoming fluid is perpendicular to the axis of the valve and also to the surface thereof which is disposed against the inlet.

It is proper to mention at this time that the valve body 6 will have a machined fit in the casing 2.

The upper end of the valve body is provided with a reduced cylindrical extension 9 forming a shoulder 8 for a bronze washer 10,—it being noted that the upper surface of this washer 10 will be substantially alined with the surface of the casing shoulder 2a, which is formed by the coring out of the upper end thereof, as previously mentioned.

The upper extremity of the reduced cylindrical, or shaft portion 9, of the valve body 6 is reduced and squared, as indicated at 9a, so as to receive the control handle or wrench 12 which will be secured to the extension 9a by means of a set screw 12a, as shown in Figures 1 and 2.

The lower end of the valve body is supported upon a second bronze washer 13 which will be of sufficient thickness to dispose the top wall of the notch or cutout 7 tangential with the upper portion of the fluid passageways 3. This last mentioned bronze washer 13 also serves to maintain the end of the valve body extension or stub shaft 6a out of contact with the bottom of the bearing portion 5a. In this way there will be no wear upon the casing bottom.

The bronze washer 10 and the adjacent shoulder 2a have superposed thereon three fabric, or packing, gaskets which may be ordinary commercial flax packing. The packing gaskets or washers 11 are engaged by the chamfered lower end of the boss 4a,—such chamfered portion being indicated at 4c and being disposed partly over the shoulder 2a and partly over the bronze washer 10, which is supported upon the valve body shoulder 8.

Inasmuch as the fiber packing 11 is in part supported by the casing shoulder 2a and in part supported by the upper bronze washer 11, it will be evident that clamping down of the cap 4 will not substantially bind the valve body and make it difficult to turn the same.

The nature of the construction is such that the valve body may be readily removed. The packing can be replaced when necessary, but in view of the construction disclosed the packing will experience but a minimum amount of wear as all contact with moving surfaces of the valve body 6 is made by means of bronze or other alloy washers.

Having thus described my invention, what I claim as new and desire to secure by Letters Patent is:

1. A heavy duty valve for high pressure fluid lines comprising a casing enlarged and tapped at one end to provide a shoulder inwardly of said tapped portion, the other end of said casing having a reduced extension providing an interior counter-sunk bearing recess within the casing, said casing having diametrically opposite fluid passage-ways, a cylindrical valve body having a machined fit with the interior wall surface of said casing and being reduced at its ends to provide bearing extensions, the unreduced portions of said body and said extensions providing shoulders, said valve body having a cutout extending transversely inwardly from one side, said cutout being dimensioned so that its rear wall may be placed tangential to said fluid passage-ways so as to permit free passage of the fluid between said inlets, metal bearing washers surrounding said reduced valve body extensions and engaging said shoulders, one of said washers being disposed in said counter-sunk recess to support said valve body clear of contact with the bottom of said bearing recess, said last named washer being of a thickness so as to dispose both top and bottom walls of said cutout in planes tangential with said fluid passage-way and said last named washer positioning said valve body so as to dispose the upper surface of the other washer in the same plane with the shoulder of said valve casing, packing in part supported by said last mentioned washer and in part by said casing shoulder, a closure cap for the valve casing and threaded thereinto, the end of said closure cap bearing upon said packing and being provided with a chamfered portion alined with said casing shoulder and said valve body shoulder, and the reduced valve body extension within said last named washer extending through said cap.

2. A heavy duty valve for high pressure fluid lines comprising a casing enlarged and tapped at one end to provide a shoulder inwardly of said tapped portion, the other end of said casing having a reduced extension providing an interior counter-sunk bearing recess within the casing, said casing having diametrically opposite fluid passage-ways, a cylindrical valve body having a machined fit with the interior wall surface of said casing and being reduced at its ends to provide bearing extensions, the unreduced portions of said body and said extensions providing shoulders, said valve body having a cutout extending transversely inwardly from one side, said cutout being dimensioned so that its rear wall may be placed tangential to said fluid passage-ways so as to permit free passage of the fluid between said fluid passage-ways, metal bearing washers surrounding said reduced valve body extensions and engaging said shoulders, one of said washers being disposed in said counter-sunk recess to support said valve body clear of contact with the bottom of said bearing recess, said last named washer being of a thickness so as to dispose both top and bottom walls of said cutout in planes tangential with said fluid passage-way and said last named washer positioning said valve body so as to dispose the upper surface of the other washer in the same plane with the shoulder of said valve casing, and packing in part supported by said last mentioned washer and in part by said casing shoulder, and means for compressing said packing.

In testimony whereof I affix my signature.

GEORGE W. SHEETS.